United States Patent
Kucinski et al.

(10) Patent No.: US 9,102,210 B2
(45) Date of Patent: Aug. 11, 2015

(54) SUSPENSION SYSTEM FOR A VEHICLE AND METHOD

(76) Inventors: Robert D. Kucinski, Clay, MI (US); Mark S. Zmyslowski, Grosse Pointe Shores, MI (US)

( * ) Notice: Subject to any disclaimer, the term of this patent is extended or adjusted under 35 U.S.C. 154(b) by 498 days.

(21) Appl. No.: 12/774,978

(22) Filed: May 6, 2010

(65) Prior Publication Data
US 2010/0223974 A1   Sep. 9, 2010

Related U.S. Application Data

(63) Continuation-in-part of application No. 11/937,249, filed on Nov. 8, 2007, now Pat. No. 7,793,954.

(60) Provisional application No. 60/945,613, filed on Jun. 22, 2007, provisional application No. 60/952,089, filed on Jul. 26, 2007.

(51) Int. Cl.
| | |
|---|---|
| *B60G 15/06* | (2006.01) |
| *B21D 51/06* | (2006.01) |
| *B60G 13/00* | (2006.01) |
| *B21D 53/36* | (2006.01) |

(52) U.S. Cl.
CPC ............. *B60G 15/062* (2013.01); *B21D 51/06* (2013.01); *B60G 13/005* (2013.01); *B21D 53/36* (2013.01); *B60G 2200/144* (2013.01); *B60G 2202/31* (2013.01); *B60G 2204/129* (2013.01); *B60G 2206/722* (2013.01); *B60G 2206/8103* (2013.01)

(58) Field of Classification Search
CPC ........ B21D 51/06; B21D 51/10; B21D 53/36; B21D 53/84; B60G 2206/8102; B60G 2206/81022; B60G 2206/811; B60G 2206/8103; B60G 2200/144
USPC ................... 72/404, 405.01, 379.2, 324, 341; 228/144, 149; 226/2
See application file for complete search history.

(56) References Cited

U.S. PATENT DOCUMENTS

| | | | | |
|---|---|---|---|---|
| 1,369,975 | A | * | 3/1921 | Johnson .................. 228/144 |
| 1,502,133 | A | * | 7/1924 | Anderson ................ 29/896.7 |
| 2,022,801 | A | * | 12/1935 | Conner ..................... 403/302 |

(Continued)

FOREIGN PATENT DOCUMENTS

| | | |
|---|---|---|
| JP | 62085705 A1 | 4/1987 |
| JP | 62137211 A1 | 6/1987 |

OTHER PUBLICATIONS

Notification of the First Office Action from The Patent Office of the People's Republic of China mailed on Nov. 9, 2009 for Application No. 200810008535.8 regarding "Suspension System for a Vehicle.".

(Continued)

*Primary Examiner* — Edward Tolan
(74) *Attorney, Agent, or Firm* — Reising Ethington P.C.

(57) ABSTRACT

A method of forming a clevis link having a substantially common wall thickness in a die begins with feeding a metallic strip having a uniform thickness of a predetermined value to the die. The metallic strip is trimmed to form a blank having volume necessary for forming the clevis link to the dimensional configuration required to support the motor vehicle, while maintaining substantially constant wall thickness. The clevis link has center of gravity to provide a necessary moment of inertia thereby enabling the clevis link to support the mass of the motor vehicle.

15 Claims, 18 Drawing Sheets

(56) References Cited

U.S. PATENT DOCUMENTS

| | | | | |
|---|---|---|---|---|
| 2,609,861 A | * | 9/1952 | Otterson | 72/414 |
| 3,058,255 A | * | 10/1962 | Gorham | 43/24 |
| 3,377,038 A | * | 4/1968 | Loudon | 248/59 |
| 3,501,117 A | * | 3/1970 | Soltysik | 248/71 |
| 3,612,461 A | * | 10/1971 | Brown | 248/317 |
| 3,691,616 A | * | 9/1972 | Immenroth et al. | 29/434 |
| 4,360,959 A | * | 11/1982 | Johannesen | 29/417 |
| 4,377,298 A | | 3/1983 | Finn et al. | |
| 4,466,763 A | | 8/1984 | Fischer | |
| 4,583,759 A | | 4/1986 | Kami et al. | |
| 4,958,792 A | * | 9/1990 | Rinderer | 248/74.2 |
| 5,145,204 A | | 9/1992 | Perkins | |
| 5,247,825 A | | 9/1993 | Erickson | |
| 5,375,870 A | | 12/1994 | Smith et al. | |
| 5,533,328 A | | 7/1996 | Zmyslowski et al. | |
| 5,716,374 A | * | 2/1998 | Francese et al. | 606/207 |
| 5,782,484 A | | 7/1998 | Kuhn, Jr. | |
| 7,261,307 B2 | * | 8/2007 | Nuno et al. | 280/124.151 |
| 2009/0012364 A1 | * | 1/2009 | Kitagawa et al. | 600/141 |

OTHER PUBLICATIONS

PCT International Search Report for International Application No. PCT/US 08/12054 mailed on Dec. 29, 2008.

United Kingdom Intellectual Property Office Search Report dated May 7, 2008 for patent application No. GB 0802792.2 filed Feb. 15, 2008.

* cited by examiner

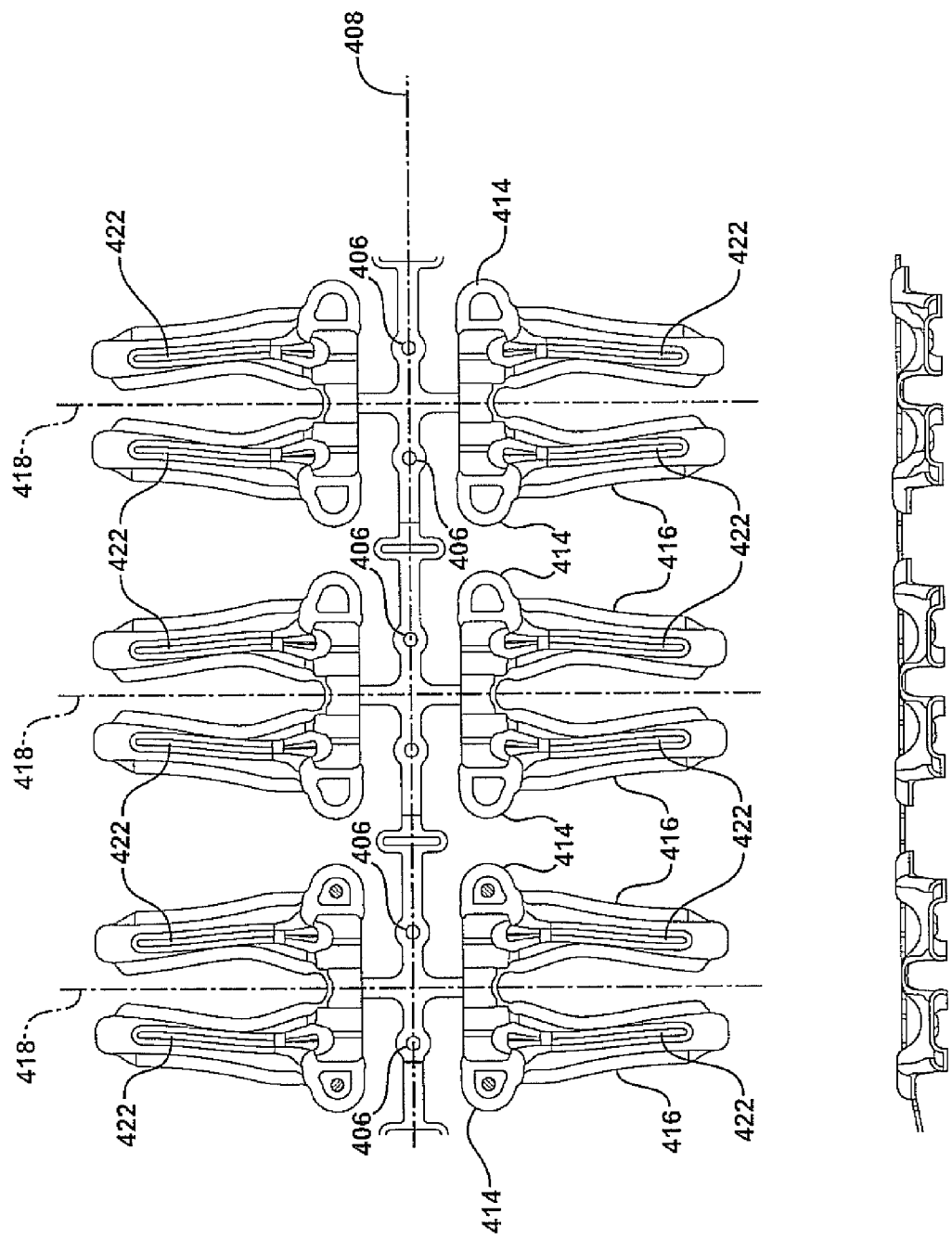

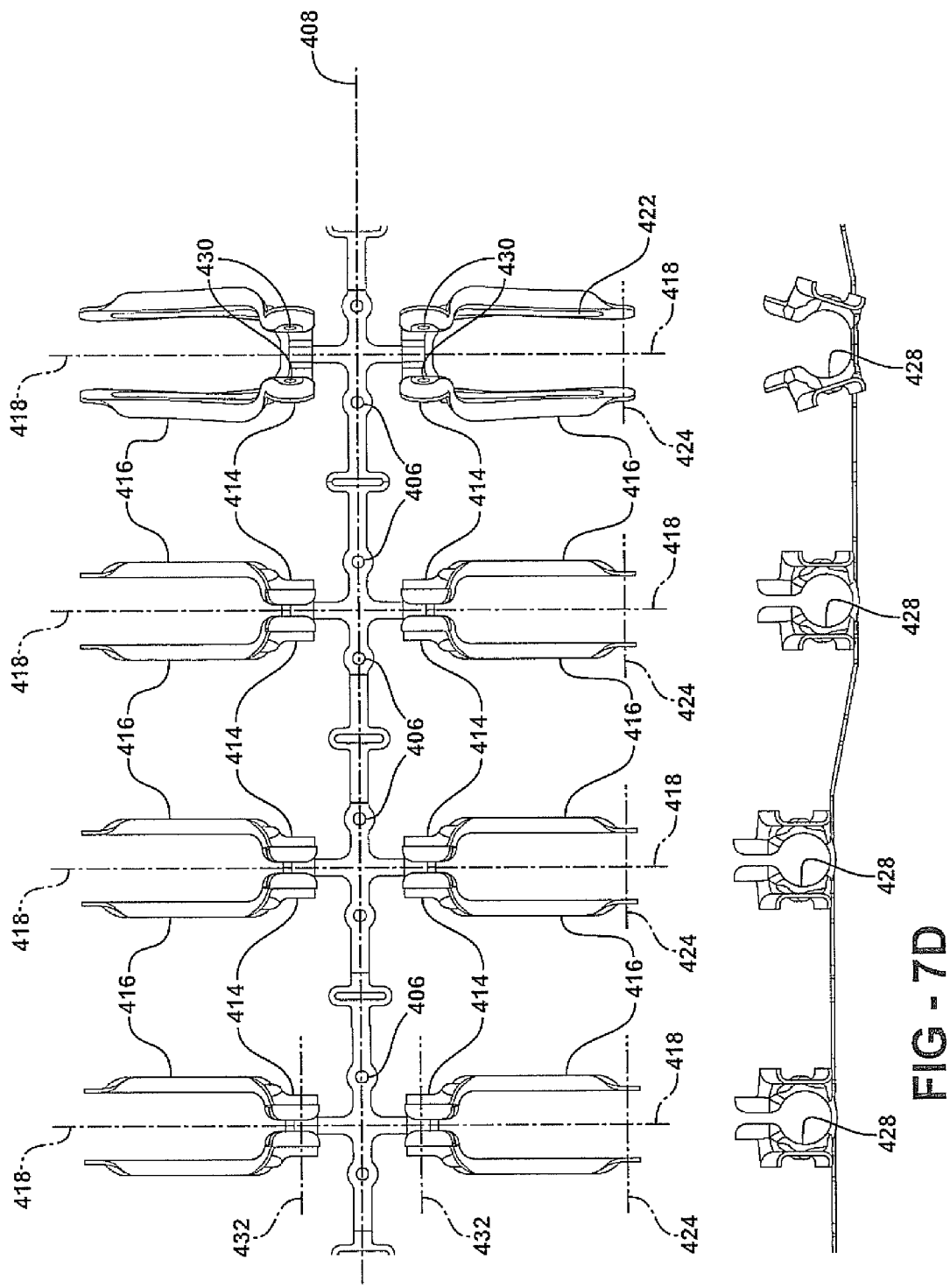

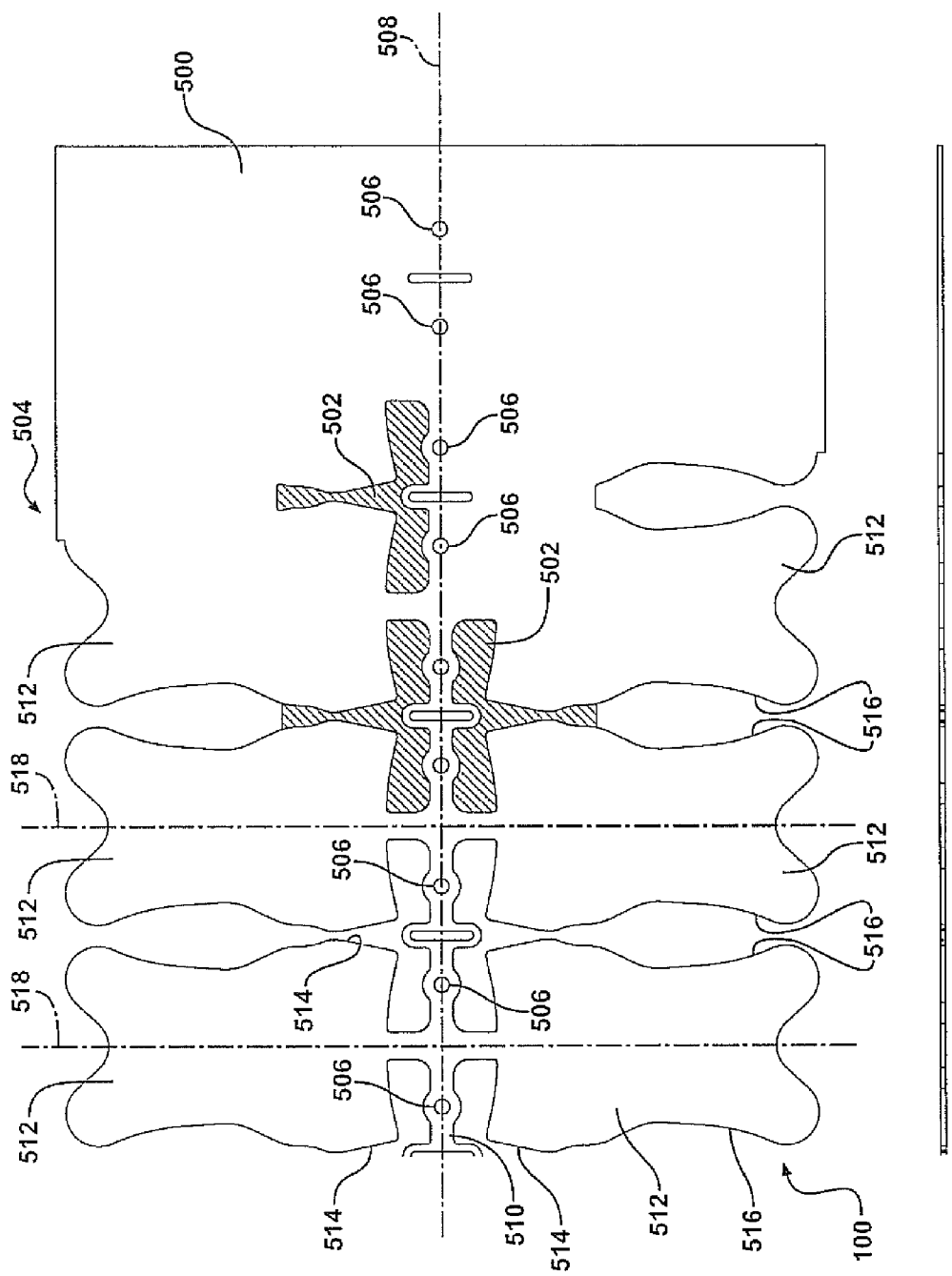

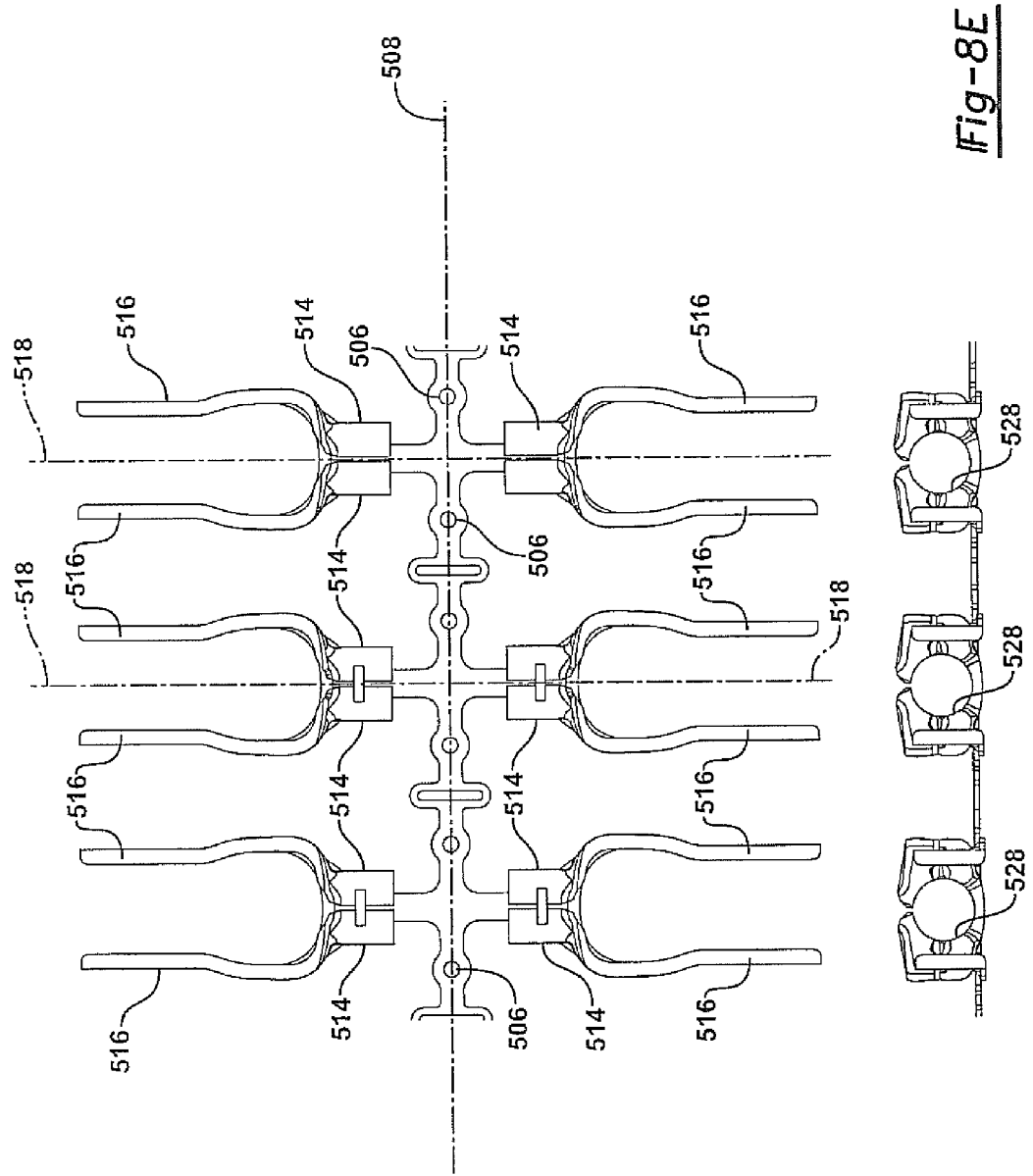

SUSPENSION SYSTEM FOR A VEHICLE AND METHOD

RELATED APPLICATIONS

This application is a continuation in part application of U.S. application Ser. No. 11/937,249 filed on Nov. 8, 2007, now U.S. Pat. No. 7,793,954 issued on Sep. 14, 2010, and claims priority to Patent Cooperation Treaty patent application serial number PCT/US2008/012054, filed on Oct. 23, 2008, U.S. nonprovisional patent application Ser. No. 11/937, 249, filed on Nov. 8, 2007, now U.S. Pat. No. 7,793,954 issued on Sep. 14, 2010, which claims priority to U.S. provisional patent application Ser. No. 60/952,089, filed on Jul. 26, 2007 and U.S. provisional patent application Ser. No. 60/945, 613, filed on Jun. 22, 2007.

FIELD OF THE INVENTION

The present invention relates a vehicle wheel suspension system and more particularly, to a vehicle wheel suspension incorporating vertical dampener struts for absorbing vibration transferred from a road surface and through the wheel.

BACKGROUND OF THE INVENTION

Like the rest of the systems on automotive vehicles, a suspension system performs a complicated function. The suspension system keeps the wheels of the automotive vehicle lined up with the travel of the automotive vehicle, limits the movement of the body of the automotive vehicle during cornering and when going over bumps, and provides a smooth and comfortable ride for passengers and drivers. Numerous suspension systems are know in the art. A short-long arm (SLA) suspension system has been common on domestic vehicles for many years. In the SLA system, each wheel is independently connected to a frame of the vehicle by a steering knuckle, ball joint assemblies, and upper and lower control arms.

A double-wishbone suspension system presents numerous components such as a frame of the vehicle, a lower arm, an upper arm, a hub for supporting a wheel assembly, and a damper. The upper and lower control arms function as locators to fix a position of the suspension system and its components relative to the automotive vehicle and are attached to the frame with bushings that permit the wheel assemblies to move up and down separately in response to irregularities in the road surface.

The prior art is replete with various suspension systems having at least one yoke or linking element for interconnecting a shock absorber mounted between the vehicle body and a lower arm. These systems are taught by the U.S. Pat. No. 4,377,298 to Finn et al.; U.S. Pat. No. 4,583,759 to Kami et al.; and U.S. Pat. No. 5,375,870 to Smith et al. The U.S. Pat. No. 4,377,298 to Finn et al., for example, disclose a vehicle wheel suspension having a shock absorber mounted between the vehicle body and a lower arm. A clevis or yoke portion formed from a pair of legs and formed from a reverse bend doubled sheet metal form, connected to a neck portion or collar to engage the shock absorber. The clevis taught by the U.S. Pat. No. 4,377,298 to Finn et al., fails to teach or suggest a reinforcing structure defined in the clevis and requires a plurality of members to form the clevis.

The U.S. Pat. No. 4,583,759 to Kami et al., for example, teaches an upper suspension arm support structure having a shock absorber mounted between the vehicle body and a lower arm. The clevis is forged from a metal and has a neck portion to engage the shock absorber and a pair of legs extending to the respective distal ends and connected to the lower arm by a fastener. The clevis of the U.S. Pat. No. 4,583,759 to Kami et al. fails to teach or suggest a reinforcing structure defined in the clevis and requires a plurality of members to form the clevis. Moreover, the clevis of the U.S. Pat. No. 4,583,759 to Kami et al., is forged from a metal thereby negatively impacting the overall weight of the system.

Therefore, an opportunity exists for an improved suspension system and method of manufacturing the same that will reduce the mass of the clevis thereby reducing the effect of vibrations and the resulting noises, add structural integrity to the suspension system, and increase performance of drive line applications at a low cost and a high volume.

SUMMARY OF THE INVENTION

The suspension system of the present invention keeps the wheel assemblies of the automotive vehicle lined up with the travel of the automotive vehicle, limits the movement of the body of the automotive vehicle during cornering and when going over bumps, and provides a smooth and comfortable ride for passengers and drivers. The suspension system presents numerous components such as a frame of the vehicle, a lower control arm, an upper control arm, a hub or a spindle for supporting the wheel assembly, and a vibration damper. The upper control arm and the lower control arm of the suspension system are cooperable with a spindle cooperable with the hub, which defines a rotational axis and supports the wheel assembly. The vibration damper having first and second terminal ends with one of the terminal ends being cooperable with the upper control arm.

A link or clevis has a monolithic construction and a generally uniform thickness. The link interconnects the lower control arm and the second terminal end of the vibration damper. The link and the vibration damper define a common axis bisecting the link and extending in a direction different from the direction of the rotational axis. The vibration damper is movable along the common axis the absorbing vibration transferred from a road surface and through the wheel. The link is stamped from a blank formed from metal, metal alloys, and combination thereof. The link includes a neck portion having a generally circular cross section for receiving the vibration damper and a pair of spaced legs.

A reinforcement rib is deformed into each of the legs thereby preventing the legs from bending as the vibration damper absorbs vibration transferred from the road surface and through the wheel. The reinforcement rib is further deformed into the neck portion tapering away from the distal end to increase strength of the link. The reinforcement rib presents a first width as the reinforcement rib extends from the distal end to the neck portion and a second width as the leg transforms to the neck portion and a third width as the reinforcement rib further tapers onto the neck portion. The neck portion includes terminal edges and a seam extending therebetween. The seam receives a connector to secure the link to the vibration damper. Each of the legs presents a face having opposed peripheral edges extending outwardly from the face and tapering proximate the distal end to present the distal end having a generally flat cross section.

A metallic strip having a uniform thickness of a predetermined value is placed on a die, such as a progressive die, a transfer die, and other dies of various types without limiting the scope of the present invention. The dimensional configuration of the clevis link is pre-determined to support the mass of a motor vehicle before the metallic strip is processed at the die. One of the operations of the inventive method requires trimming of the metallic strip to form a blank having volume necessary for forming the clevis link to the dimensional configuration required to support the motor vehicle so that no secondary trimming is required. A reinforcement rib is formed in each of the legs, generally in the middle of each leg, while the neck portion and the legs are curled to the center of the blank thereby forming the clevis link of uniformed thickness and eliminating thickness offset between the thickness of the neck portion and the legs.

Alluding to the above, the clevis link of the present invention is formed to a three dimensional configuration while maintaining substantially constant wall thickness. The inventive method enables formation of the clevis link wherein a center of gravity in the clevis link having a substantially common wall thickness provides a necessary moment of inertia enabling the clevis link to support the mass of the motor vehicle.

An advantage of the present invention is to provide the improved link for the suspension system that is stamped from a sheet metal presenting a light weight alternative to an iron cast links known in the prior art.

Another advantage of the present invention is to provide an improved link for the suspension system that reduces the mass of the improved link.

Still another advantage of the present invention is to provide an improved link having at least one reinforcement rib deformed into each of the legs of the link thereby preventing the legs from bending as the vibration damper absorbs vibration transferred from the road surface and through the wheel and to provide structural integrity to the link and the entire suspension system.

Still another advantage of the present invention is to provide an improved mounting structure for mounting both right and left suspension assemblies as a unit to the vehicle body.

BRIEF DESCRIPTION OF THE DRAWINGS

Other advantages of the present invention will be readily appreciated as the same becomes better understood by reference to the following detailed description when considered in connection with the accompanying drawings wherein:

FIGS. 7A through 7E illustrates various stages of formation of the clevis link shown in FIG. 3A wherein consecutive stages of the clevis formation are presented in a general view and a cross sectional view as the inventive link is fabricated from a metal blank and resulting in the inventive link;

FIGS. 8A through 8F illustrates various stages of formation of alternative embodiment of the clevis link shown in FIG. 4 wherein consecutive stages of the clevis formation are presented in a general view and a cross sectional view as the inventive link is fabricated from a metal blank and resulting in the inventive link;

DETAILED DESCRIPTION OF THE INVENTION

Figure 1:
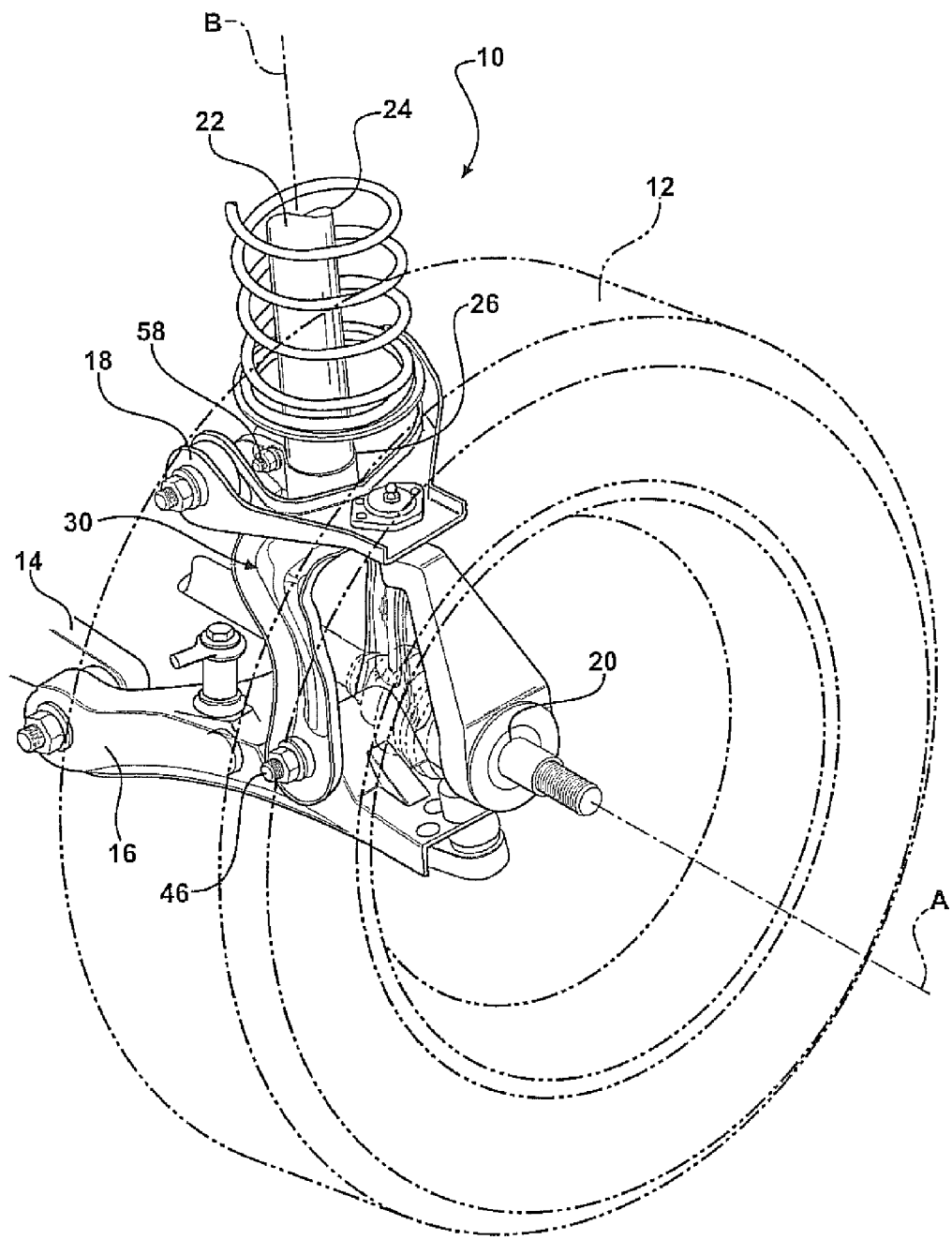
FIG. 1 illustrates a perspective view of a suspension assembly having an upper arm and a lower arm and a link cooperable with a vibration damper and connected to the lower arm.
Figure 2:
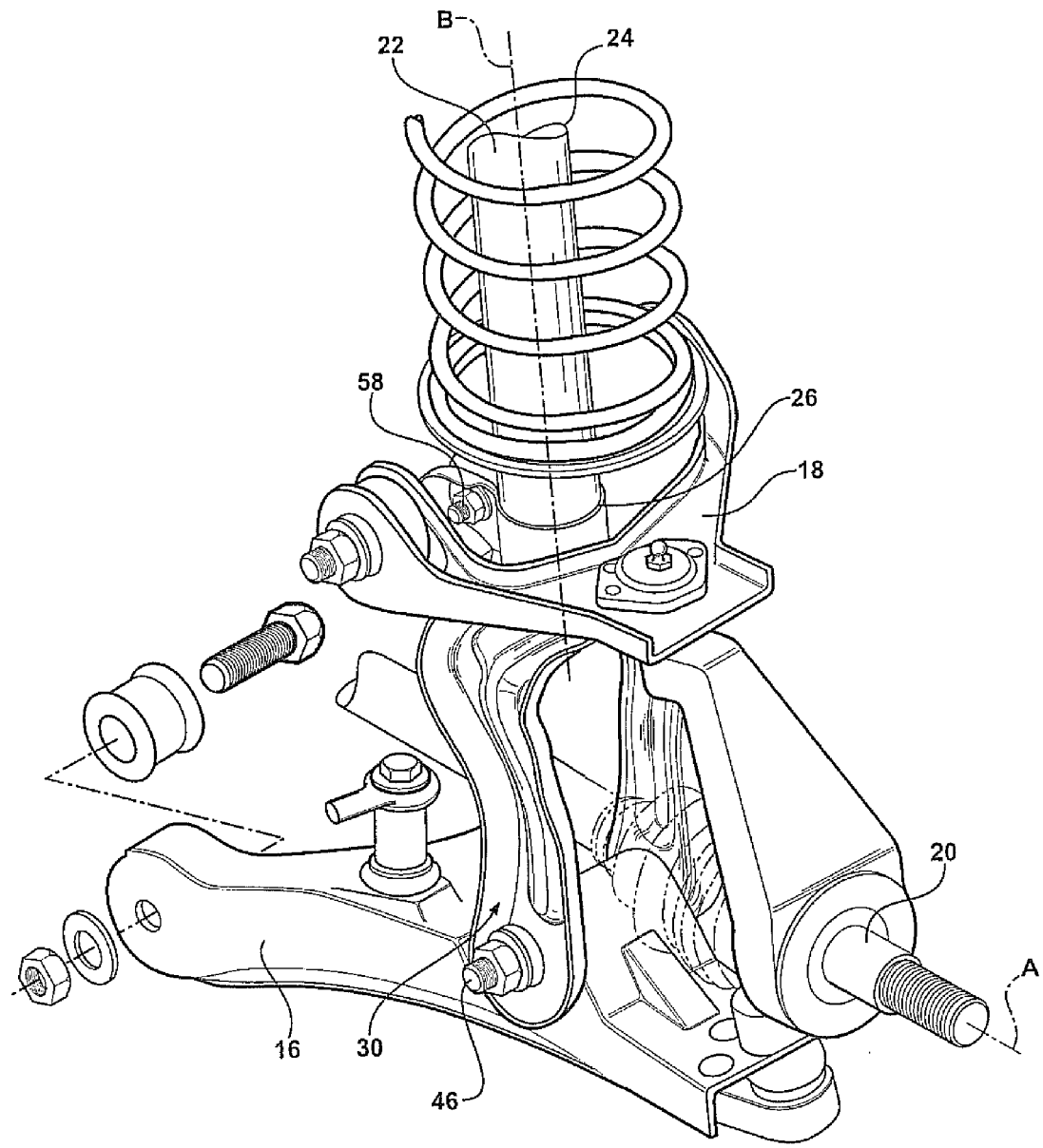
FIG. 2 illustrates a illustrates a perspective and partially exploded view of the suspension assembly of FIG. 1.

Referring to the Figures, wherein like numerals indicate like or corresponding parts, a suspension system of the present invention is generally shown at 10 in FIGS. 1 and 2. The suspension system 10 keeps the wheel assemblies 12 of an automotive vehicle (not shown) aligned with the travel of the automotive vehicle, limits the movement of the body of the automotive vehicle during cornering and traveling over rough surfaces, and provides a smooth and comfortable ride for passengers and drivers. The suspension system 10 presents numerous components such as a frame 14 (only partially shown in FIG. 1) of the vehicle, a lower control arm 16, an upper-control arm 18, a hub or a spindle 20 for supporting the wheel assembly 12 and defining a rotational axis A, and a vibration damper or strut 22. The upper and lower control arms 16 and 18 function as locators to fix a position of the suspension system 10 and its components relative to the automotive vehicle and are attached to the frame 14 with bushings (not shown) that permit the wheel assemblies 12 to jounce and rebound separately in response to irregularities in the road surface. Those skilled in the automotive art will appreciate that the suspension system 10 described above and to be described further below may be a short-long arm (SLA) suspension system as has been common on domestic vehicles for many years, a double-wishbone suspension systems, and other suspension systems of the kind without limiting the scope of the present invention.

The vibration damper 22 has first and second terminal ends 24 and 26 with the second terminal end 26 being cooperable with the upper control arm 18. A link or clevis, generally indicated at 30 in FIGS. 1 through 3, interconnects the vibration damper 22 and the lower control arm 16, as best shown in FIG. 2. The link 30 is stamped from a blank of metal, metal alloys, and combination thereof, as the blank goes through a progressive die tool, a line die tool, or a transfer die tool, as described in the provisional application Ser. Nos. 60/945,613, filed Jun. 22, 2007 and 60/952,089 filed Jul. 26, 2007 and incorporated herewith in its entirety. One material contemplated by the inventors is 60 KSI minimal yield alloy. The 60 KSI alloy is high strength and is known to be difficult form with dimensional accuracy required of the inventive clevis link disclosed in this application. The method of forming this alloy is more fully set forth below and discloses the steps required to hold the requisite dimensional accuracy. Other equivalent high strength alloys have also been considered feasible by the inventors.

Figure 3A:
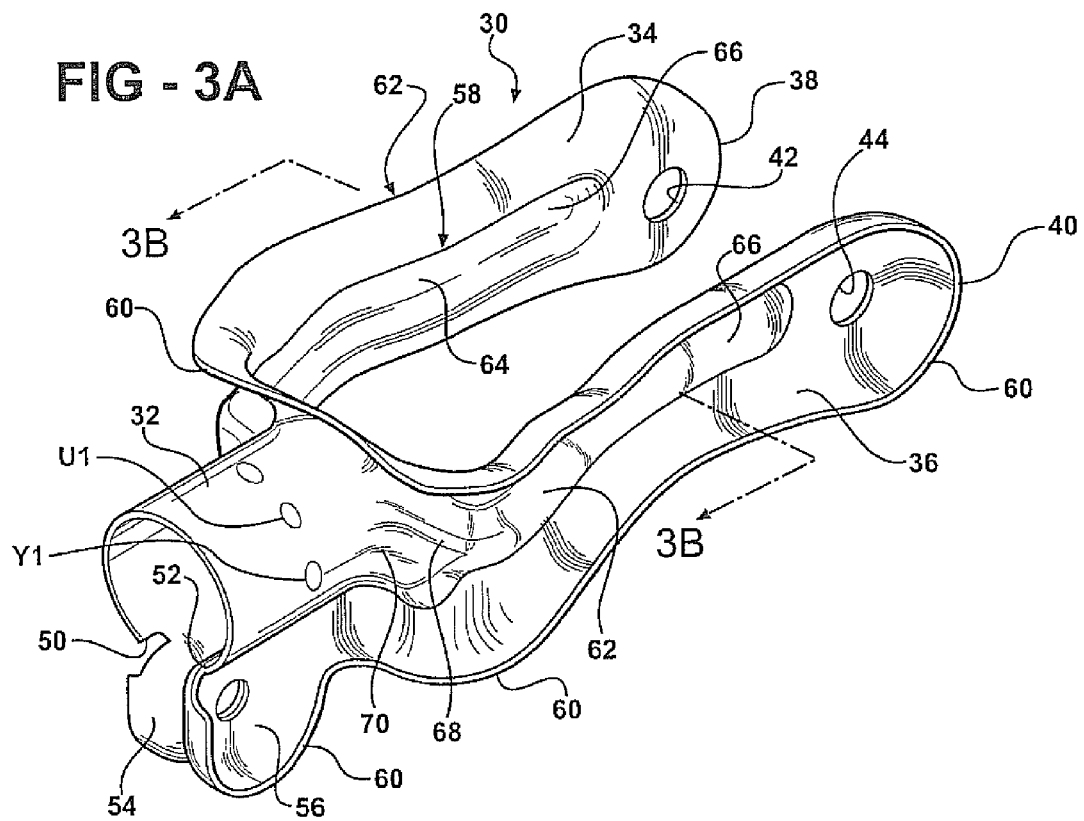
FIG. 3A illustrates the inventive link having a monolithic construction and a generally uniform thickness.
Figure 3B:
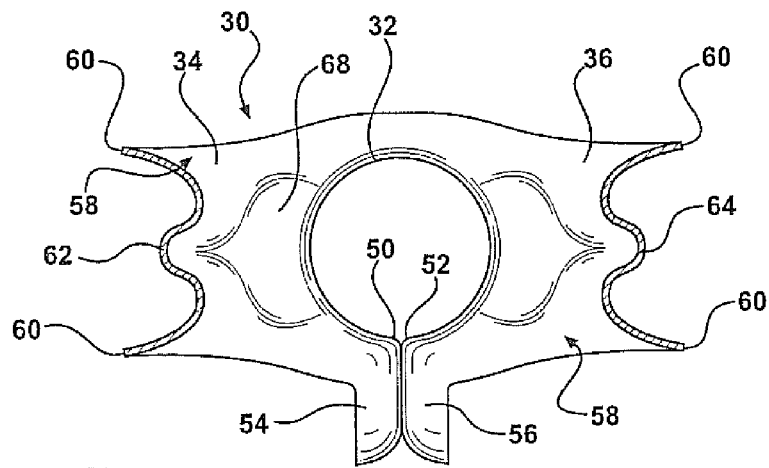
FIG. 3B illustrates the cross sectional view of the link shown in FIG. 3A and taken along lines 3B-3B.

The link 30 presents a monolithic construction having a generally uniform thickness, as best shown in FIG. 3B. The link 30 interconnects the lower control arm 16 and the second terminal end 26 of the vibration damper 22. As best shown in FIG. 2, the link 30 and the vibration damper 22 define a common axis B bisecting the link 30 and extending in a direction different from the direction of the rotational axis A. The vibration damper 22 is movable along the common axis B to absorb vibration transferred from a road surface and through the wheel assembly 12.

Referring now to FIG. 3A, the link 30 is further defined by a neck portion 32 having a circular cross section and a pair of opposing legs 34 and 36 extending from the neck portion 32 to distal ends 38 and 40. A plurality of weld openings 41 are optionally formed peripherally defined in the neck portion 32 to weld the neck portion 32 to the vibration damper 22. Each distal end 38 and 40 defines an opening 42 and 44 to receive a fastener 46 (see FIG. 2) for affixing the link to the lower control arm 16 (see FIG. 2). The neck portion 32 includes terminal edges 50 and 52 and a pair of lips 54 and 56 extending from each of the terminal edges 50 and 52 to receive a connector 58 extending therethrough as the neck portion 32 circumscribes and engages the terminal end of the vibration damper 22, as best shown in FIGS. 1 and 2.

Figure 5:
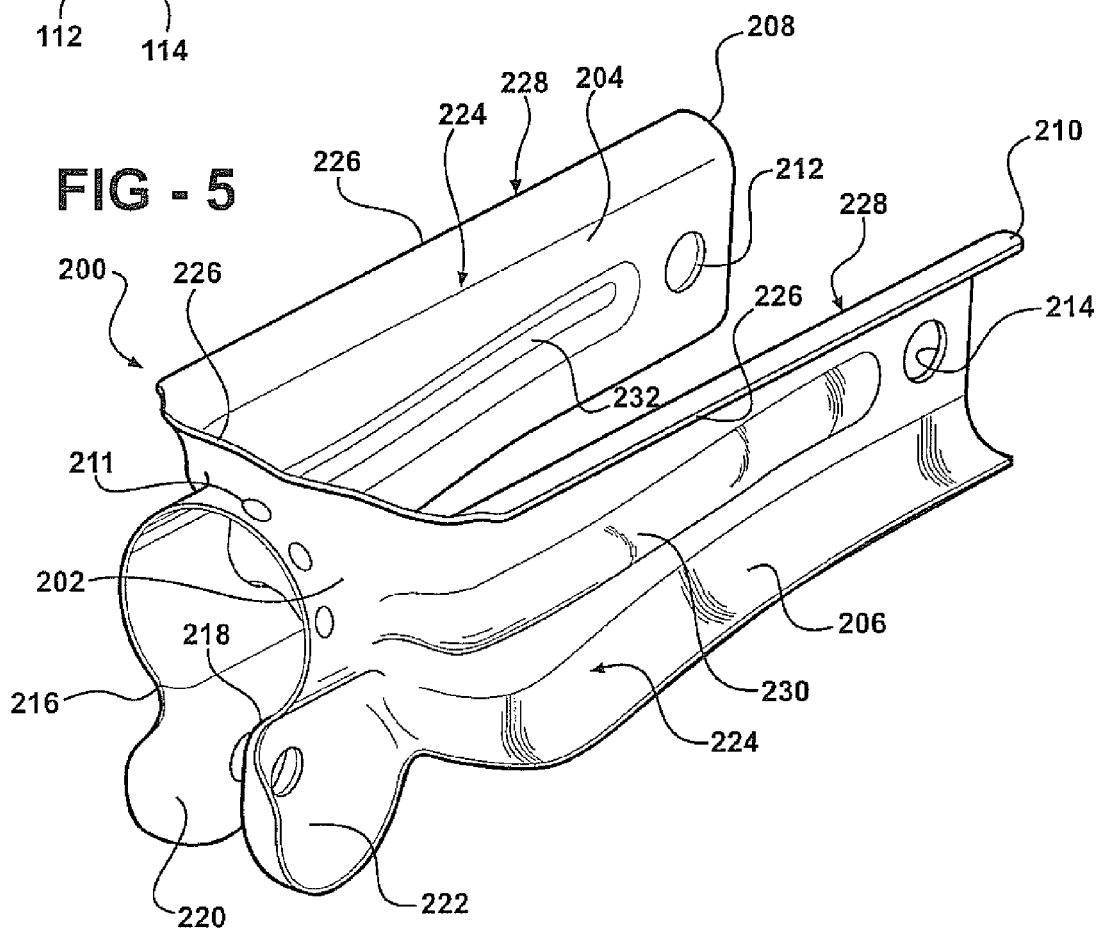
FIG. 5 illustrates a second alternative embodiment of the inventive link.

Referring back to FIGS. 3A and 3B, each of the legs 34 and 36 defines a periphery, generally indicated at 58, extending to a common flange 60 for strengthening the link 30. The common flange 60 further extends to surround the pair of lips 54 and 56. The flange 60 becomes tapered proximate to the distal end 38 and 40 of each of the legs 34 and 36 (not shown). Alternatively, as shown in FIG. 3A and without limiting the scope of the present invention, the flange 60 partially circumscribes the distal end 38 and 40. The periphery 58 defines a generally curvilinear geometry 62 as shown in FIG. 5. The periphery 58 defines a generally linear geometry (not shown).

A pair of reinforcement ribs 62 and 64 is formed into each leg 34 and 36. The ribs 62 and 64 further extend into neck portion 32 thereby tapering in an opposite direction from the distal ends of each of the legs 34 and 36 to increase strength of the link 30. The reinforcement ribs 62 and 64 bridge the neck portion 32 and the legs 34 and 36. The reinforcement ribs 62 and 64 present a first width 66 as the reinforcement ribs 62 and 64 extends from the distal end to the neck portion 32 and a second width 68 as each of the legs 34 and 36 transforms to the neck portion 32 and a third width 70 as the reinforcement ribs 62 and 64 further taper onto the neck portion 32.

Figure 4:
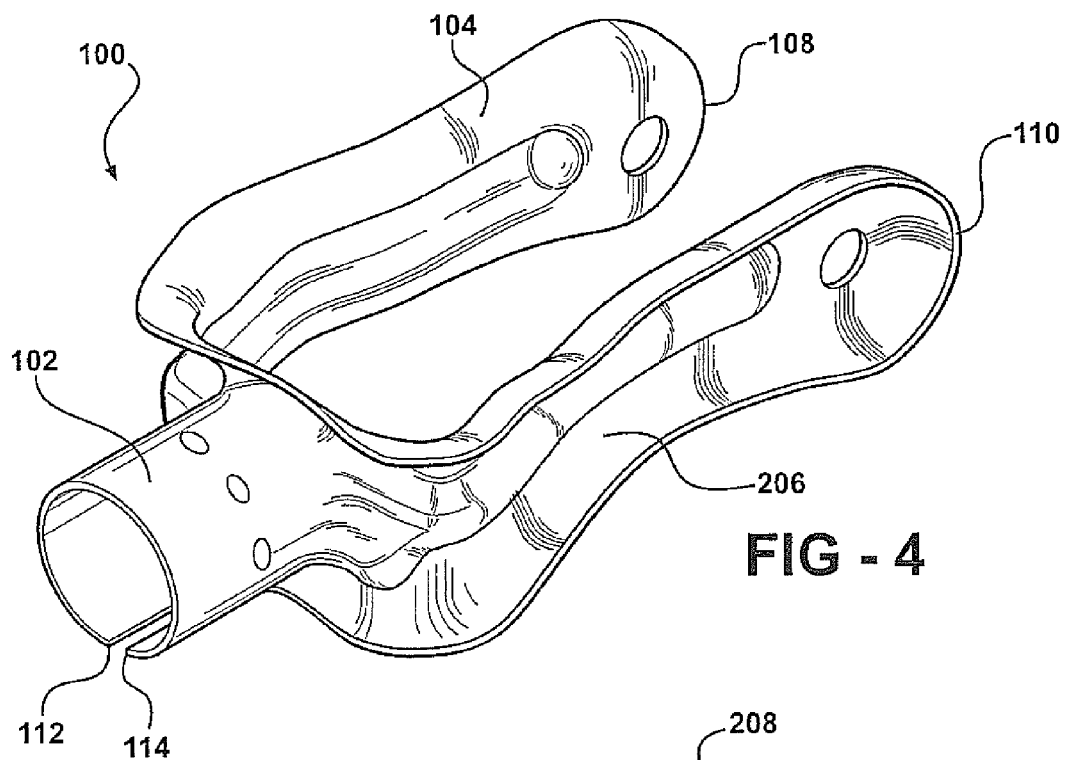
FIG. 4 illustrates a first alternative embodiment of the inventive link.

FIG. 4 illustrates a first alternative embodiment of the inventive link, generally shown at 100. The numeral references will be reflected accordingly to distinguish the first alternative embodiment illustrated in FIG. 4 from the embodiment of the link as shown in FIG. 3A without limiting the scope of the present invention. The link 100 is further defined by a neck portion 102 having a substantially circular cross section and a pair of opposing legs 104 and 106 extending from the neck portion 102 to distal ends 108 and 110. A plurality of weld openings 111 are formed peripherally defined in the neck portion 102 to weld the neck portion 102 to connect the neck portion 102 to the vibration damper 22. The neck portion 102 includes terminal edges 112 and 114 spaced from one another thereby forming a seam. All other parts of the link 100 are generally identical to the link 30 as illustrated in FIGS. 3A and 3B.

FIG. 5 illustrates a second alternative embodiment of the inventive link generally indicated at 200. The numeral references will be reflected accordingly to distinguish the second alternative embodiment illustrated in FIG. 5 from the embodiment of the link as shown in FIGS. 3A and 4 without limiting the scope of the present invention. Referring now to FIG. 5, the link 200 is further defined by a neck portion 202 having a circular cross section and a pair of opposing legs 204 and 206 extending from the neck portion 202 to distal ends 208 and 210. A plurality of weld openings 211 are formed peripherally defined in the neck portion 202 to connect the neck portion 202 to the vibration damper 22. Each distal end 208 and 210 defines an opening 212 and 214 to receive a fastener 46 for affixing the link to the lower control arm 16. The neck portion 202 includes terminal edges 216 and 218 and a pair of lips 220 and 222 extending from each of the terminal edges 216 and 218 to receive a connector 58 extending therethrough as the neck portion 202 circumscribes and engages the terminal end of the vibration damper 22, as best shown in FIG. 2.

Referring back to FIG. 5, each of the legs 204 and 206 defines a periphery, generally indicated at 224, extending to a common flange 226 for strengthening the link 200. The common flange 226 further extends to surround the pair of lips 220 and 222. The periphery 224 defines a generally linear geometry 228. A pair of reinforcement ribs 230 and 232 is formed into each leg 204 and 206. The ribs 230 and 232 further extend into neck portion 202 thereby tapering in an opposite direction from the distal ends of each of the legs 204 and 206 to increase strength of the link 200. The reinforcement ribs 230 and 232 bridges the neck portion 202 and the legs 204 and 206. The reinforcement ribs 230 and 232 present a uniform width or a variable width.

Figure 6:
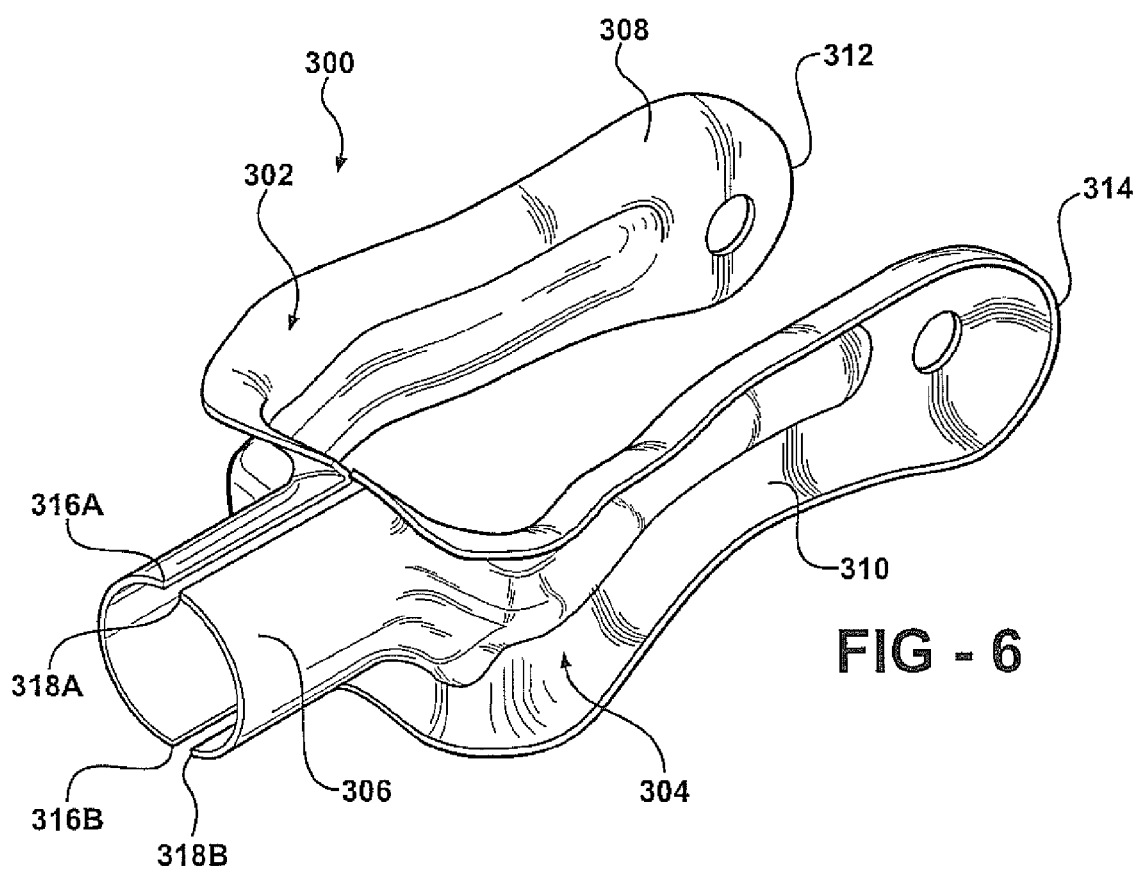
FIG. 6 illustrates a third alternative embodiment of the inventive link.

FIG. 6 illustrates a third alternative embodiment of the inventive link, generally shown at 300. The numeral references will be reflected accordingly to distinguish the first alternative embodiment illustrated in FIG. 4 from the embodiment of the link as shown in FIG. 3A without limiting the scope of the present invention. The link 300 is formed from two parts, generally indicated at 302 and 304, when combined forming a neck portion 306 having a circular cross section and a pair of opposing legs 308 and 310 extending from the neck portion 306 to distal ends 312 and 314. A plurality of weld openings 315 are peripherally defined in the neck portion 306 to connect the neck portion 306 to the vibration damper 22. The neck portion 306 includes terminal edges 316 A-B and 318 A-B spaced from one another thereby forming a seam. As the parts 302 and 304 circumscribe the terminal end 26 of the vibration damper 22, the parts 302 and 304 are welded thereto. All other parts of the link 300 are identical to the link 30 as illustrated in FIGS. 3A and 3B.

Referring now to FIGS. 7A through 7E, a method of forming the clevis link 30, as illustrated in FIG. 3A, will be discussed. In particular, FIGS. 7A through 7E illustrate various stages of formation of the clevis link 30, wherein consecutive stages of the clevis formation are presented in a general view and a cross sectional view as the clevis link 30 is fabricated from a metal blank.

The process begins by trimming a metal blank resulting in the inventive link 30. FIG. 7A through 7E also illustrate a cross sectional view of the metal strip transformed to a carrier element for holding two sets of oppositely spaces links 30. Similarly, FIGS. 8A through 8F illustrates a general view of the progressive die operation presenting various steps of formation of an alternative embodiment of the inventive link, such as, for example, the link 30, wherein the process begins by forming a metal blank resulting in the inventive link 100. FIGS. 8A through 8F also illustrates a cross sectional view of the metal strip transformed to a carrier element holding two sets of oppositely spaces links 100. Those skilled in the metal stamping art will appreciate that other dies, such as, a transfer die, line die, or combination of these dies, may be utilized to form the links 30, 100 without limiting the scope of the present invention.

Figure 7A:
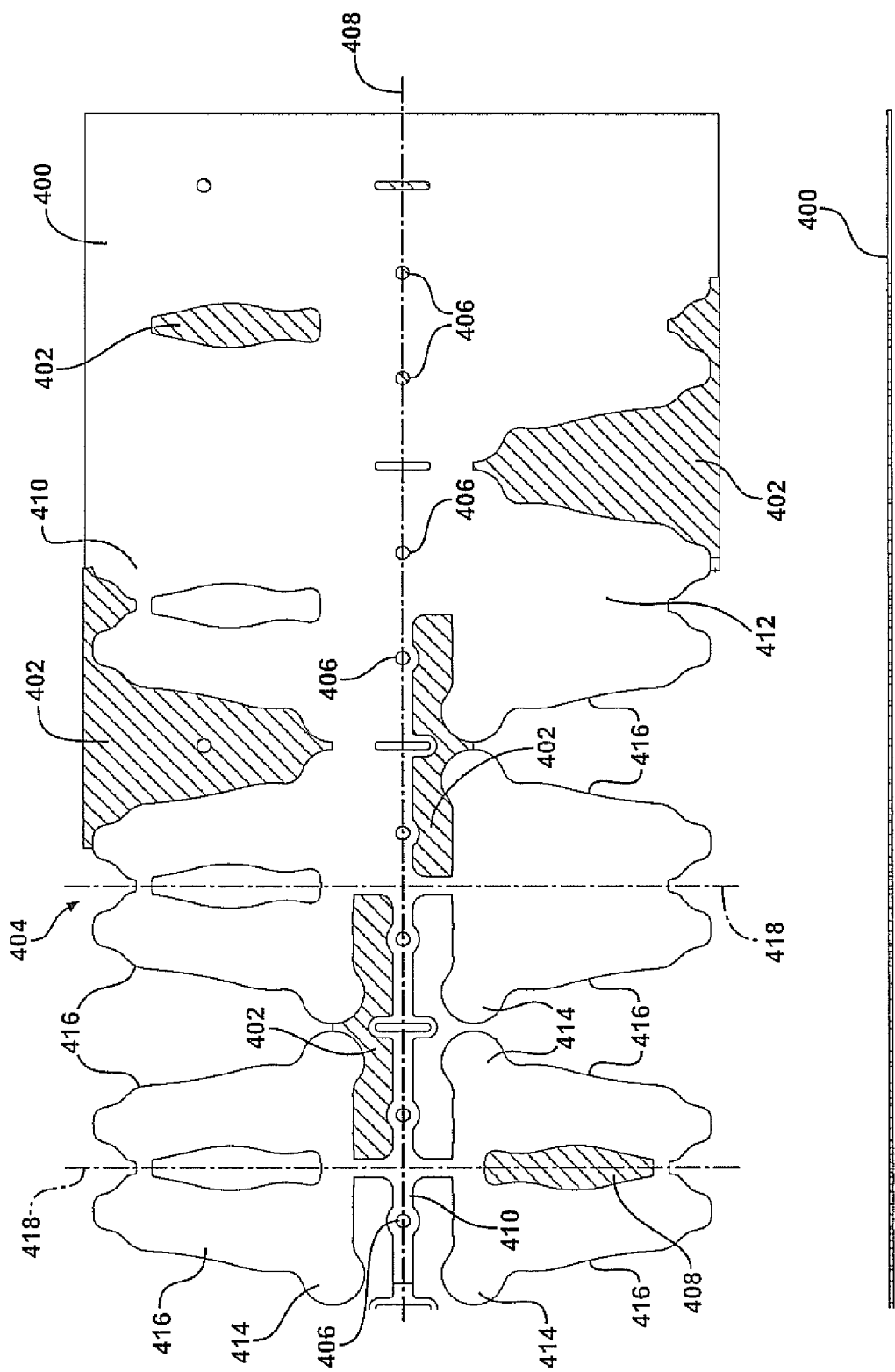

Alluding to the above referenced FIGS. 7A through 7E, the method of forming the link 30 having a substantially common wall thickness, begins with feeding a metallic strip 400 having a uniform thickness of a predetermined value to the die (not shown). The dimensional configuration of the link 30 is predetermined before the metal strip 400 is fed into the die necessary to support the mass of the motor vehicle. FIG. 7A presents several "shaded" fragments or sections 402 to more clearly define cut out sections of metal trimmed away from the common metal strip 400 to form contour of the link 30. As the trimming operation, generally shown at 404 in FIG. 7A, begins, the die forms a plurality of locating holes 406 along a central axis 408 of the metal strip 400. These locating holes 406 are used to receive pins (not shown) extending from the die for holding and carrying a carrier element 410 before the carrier element 410 is cut away (not shown) at the final stage, shown in FIG. 7E to provide dimensional accuracy while forming the link 30 the opposing links 30 supported by the carrier element 410 are separated from one another so the two links are formed simultaneously.

Referring to FIG. 7A, as the initial several stages of the trimming operation begin, the metallic strip 400 is trimmed to the predetermined dimensional configuration to form two oppositely spaced blanks 412 of the link 30 having predetermined contours of the neck portion 414 and legs 416 and axis 418, extending generally perpendicular to the central axis 408 of the metal strip 400. The contours illustrated in FIG. 7A, for example, are not intended to limit the scope of the present invention and are presented for exemplary purposes. The trimming operation removes metal at the neck portions 414 of each blank 412 oppositely spaced from one another to form the aforementioned carrier element 410, as shown at 420. As the carrier element 410 is formed, the blank 412 is trimmed along the axis 418 to further define a cut out portion between the legs 416. No further trimming is performed beyond that which is shown in FIG. 7A. Therefore, the volume of the inventive link 30 established while the link 30 is still in a two dimensional configuration.

Figure 7B:
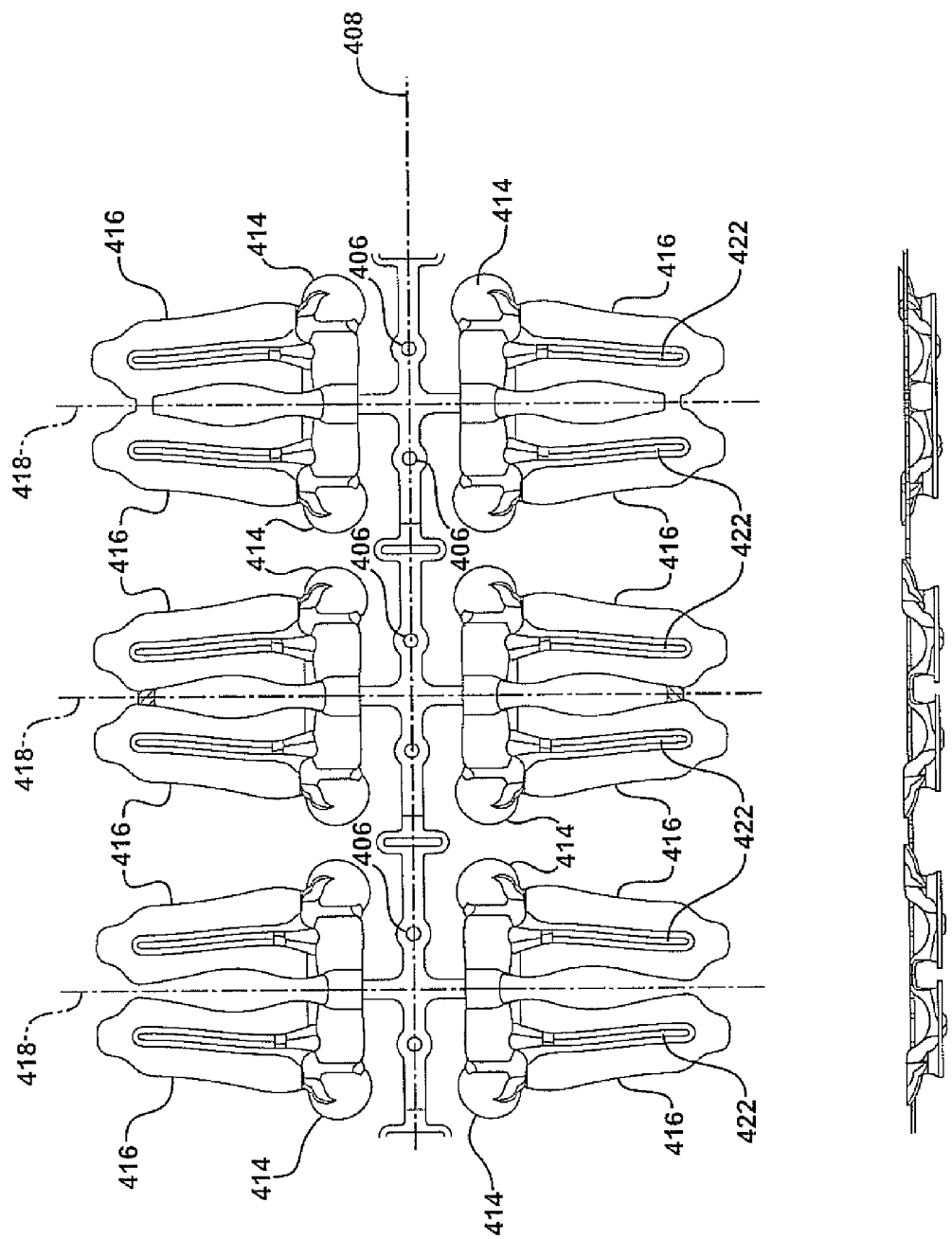
Figure 7E:
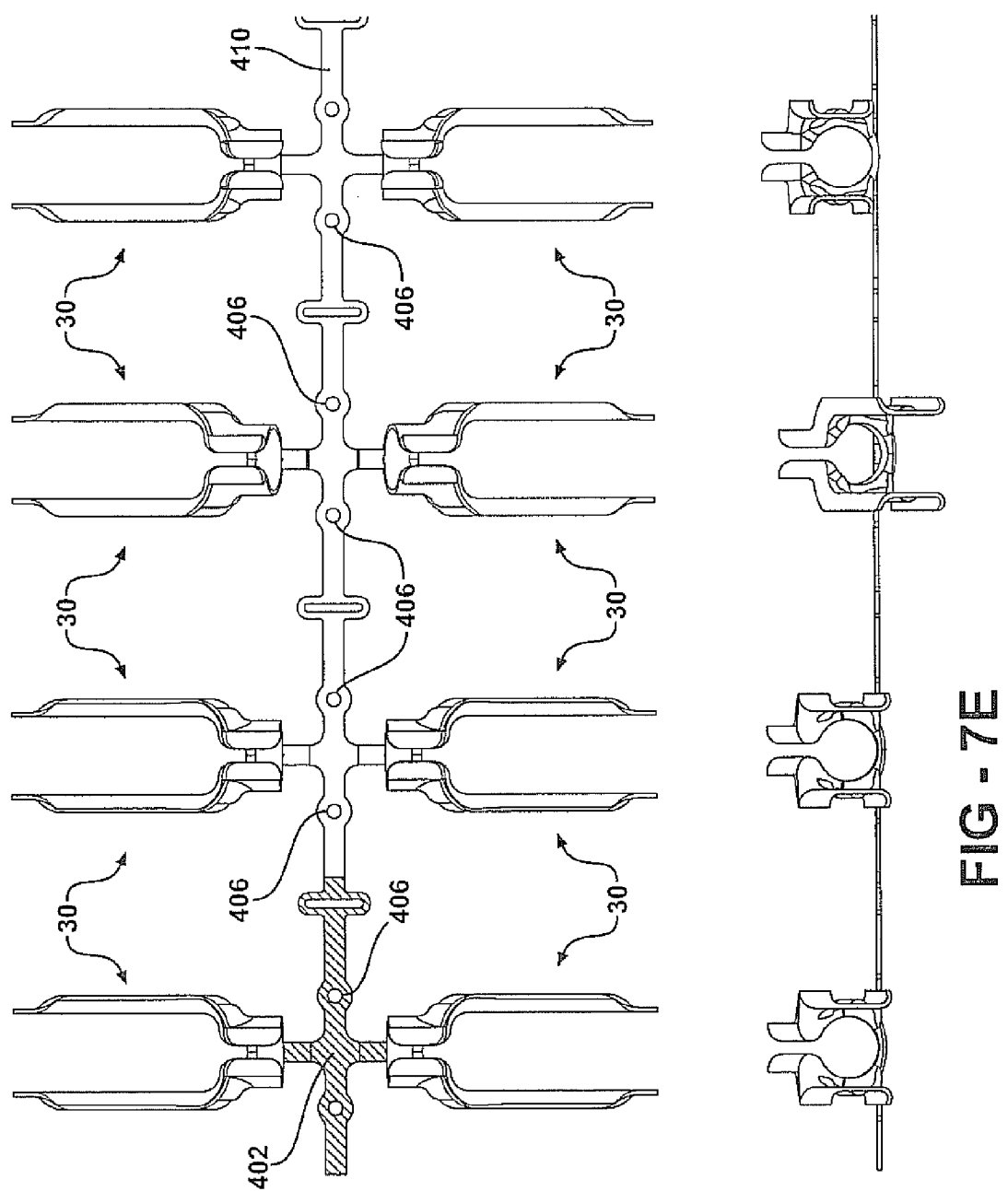

As the blanks 412 trimmed to a predetermined contours are moved along the die, the blanks 412 oppositely spaced from one another along the axis 408 are subject to several camming operations transforming from a planar cross section, as illustrated in FIG. 7A, to a three dimensional configuration, as shown in stages illustrated in FIGS. 7B and 7C. This occurs while maintaining substantially constant wall thickness and a center of gravity in the link 30 thereby providing a necessary moment of inertia enabling the link 30 to support the mass of the motor vehicle. The location of the center of gravity in the link 30 is predetermined by the ratio between the neck portion 414 and legs 416 of the link 30 before the metallic strip 400 is fed to the progressive die. The location of the center of gravity is critical to the function of the link 30 due to the substantially constant wall thickness of the link 30 that is stamped from sheet metal. This differs from the adjustment to location of the center of gravity of a cast link, which is adjusted by changing material thickness by locally adding mass anywhere on the casting.

Figure 9B:
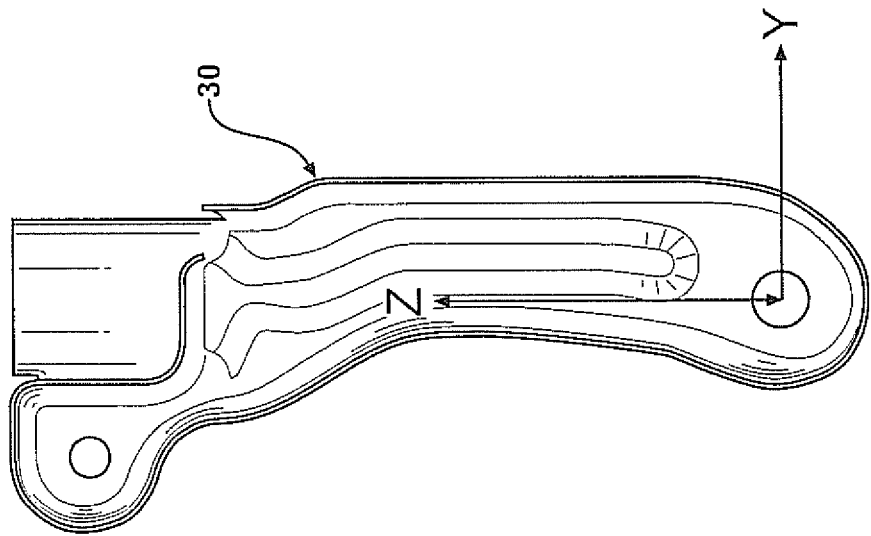
FIG. 9B is a side view of the clevis link of FIG. 3A having moment of inertia.
Figure 9A:
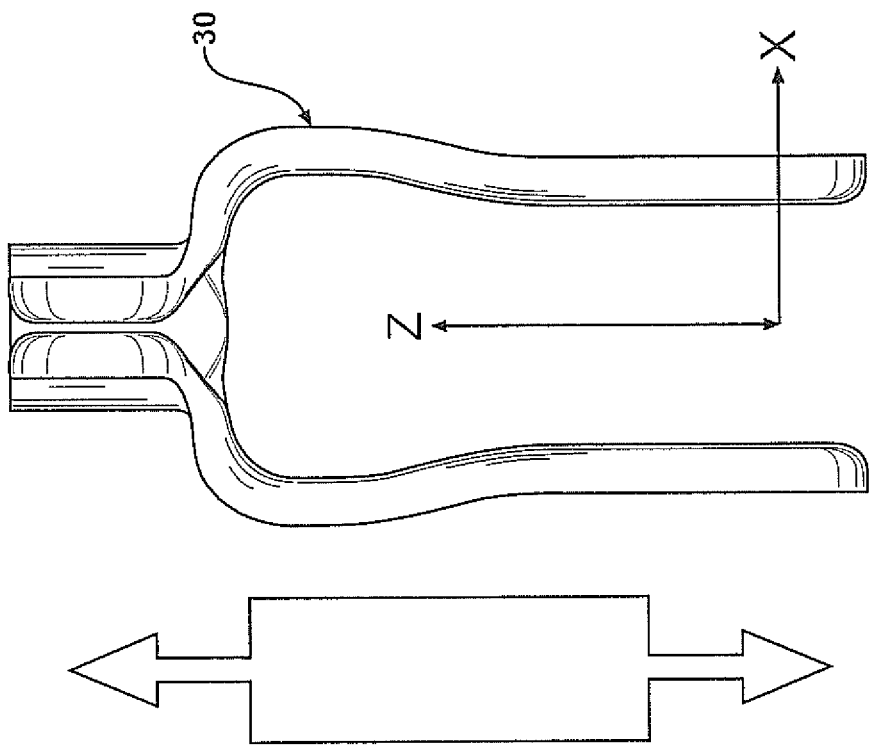
FIG. 9A is a front view of the clevis link of FIG. 3A having moment of inertia.
Figure 10B:
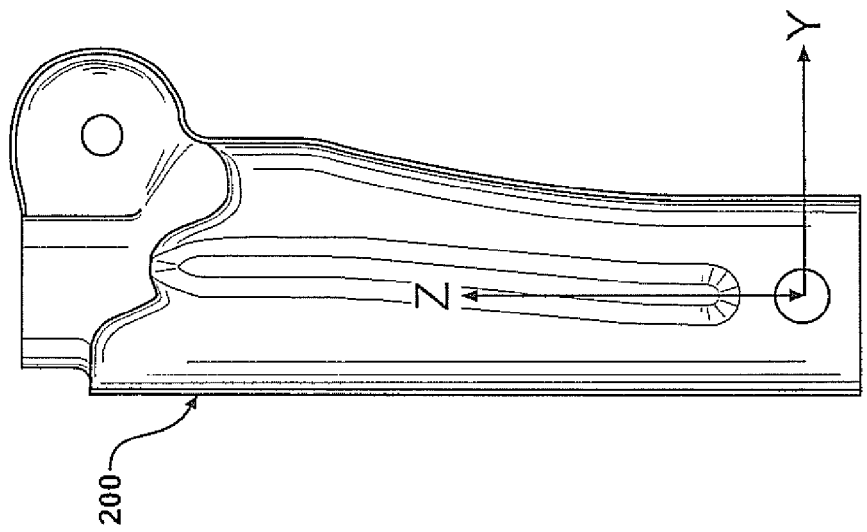
FIG. 10B is a side view of the clevis link of FIG. 5 having moment of inertia.
Figure 10A:
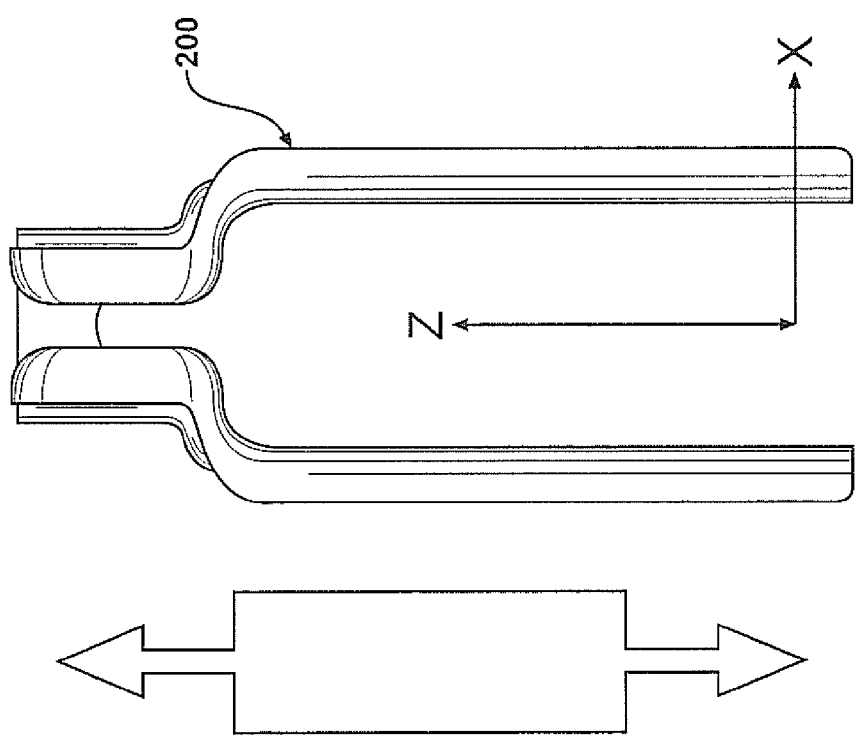
FIG. 10A is a front view of the clevis link of FIG. 5 having moment of inertia.

The three dimensional configuration of the link 30 is further defined by forming the reinforcement ribs 422 in each of the legs 416 by locating the reinforcement rib 422 generally in the middle of each leg 416. To maintain constant wall thickness, the neck portion 414 and the legs 416 are curled to the center 418 of the respective blank 412, i.e. the axis by the die surfaces configured to form the predetermined configuration of the reinforcement rib 422 and the neck portions 414. The configuration of the die surfaces is not shown in the present application, but is understood to be a mirror image of the clevis link 30. As the three dimensional configuration is formed, each blank 412 is folded in a circular fashion, as best shown in FIG. 7D to change the position of the legs 416 from adjacent to one another along the respective axis Y (FIGS. 9, 10) to oppositely spaced to one another, whereby each of the legs 416 includes an opening 417 defining a common opening axis X (FIGS. 9, 10). The openings in each leg 416 are used to connect the link 30 to the motor vehicle.

The intersection of the axis Y, X is the location of the center of gravity of the inventive clevis link 30, 100, 200, 300. The center of gravity is located to optimize the moment of inertia (MOI) for satisfying loads, including but not limited to jounce and rebound conditions. Due to these conditions, the clevis link 30, 100, 200, 300 must support more than the vehicle weight, including up to two, three, or more times the vehicle weight. Unlike a cast clevis link, where a center of gravity is moved merely by adding mass or thickness, the clevis link 30, 100, 200, 300 of this invention makes use of geometric revisions.

Folding of the neck portion 414 is required to form the link 30 having a generally tubular configuration 428, as shown in FIG. 7D, and positions the legs 416 in an opposed, substantially parallel orientation with slots defined in each of the legs 416 and the slots 430 defined in the neck portion 414 are oriented along a generally common axis 432, as shown in 7D. Circularity of the neck portion 414 is achieved by 414 is achieved by first deforming into opposing radial neck sections 433 spaced apart by a central section 435 of said neck portion. The central section 435 of the neck portion 414 is deformed in a direction opposite to the opposing radial neck sections 433. The deformation of central section 435 of the neck portion 414 in this opposite direction produced the unexpected result of improving circularity of the eck portion 414 when the opposing radial neck sections 433 are closed to form the tubular neck 32, 102, 202, 306. When the link 30 is completed the carrier element is cut away at the final stage to separate two of the oppositely spaced links 30 supported by the carrier element from one another.

Figure 8B:
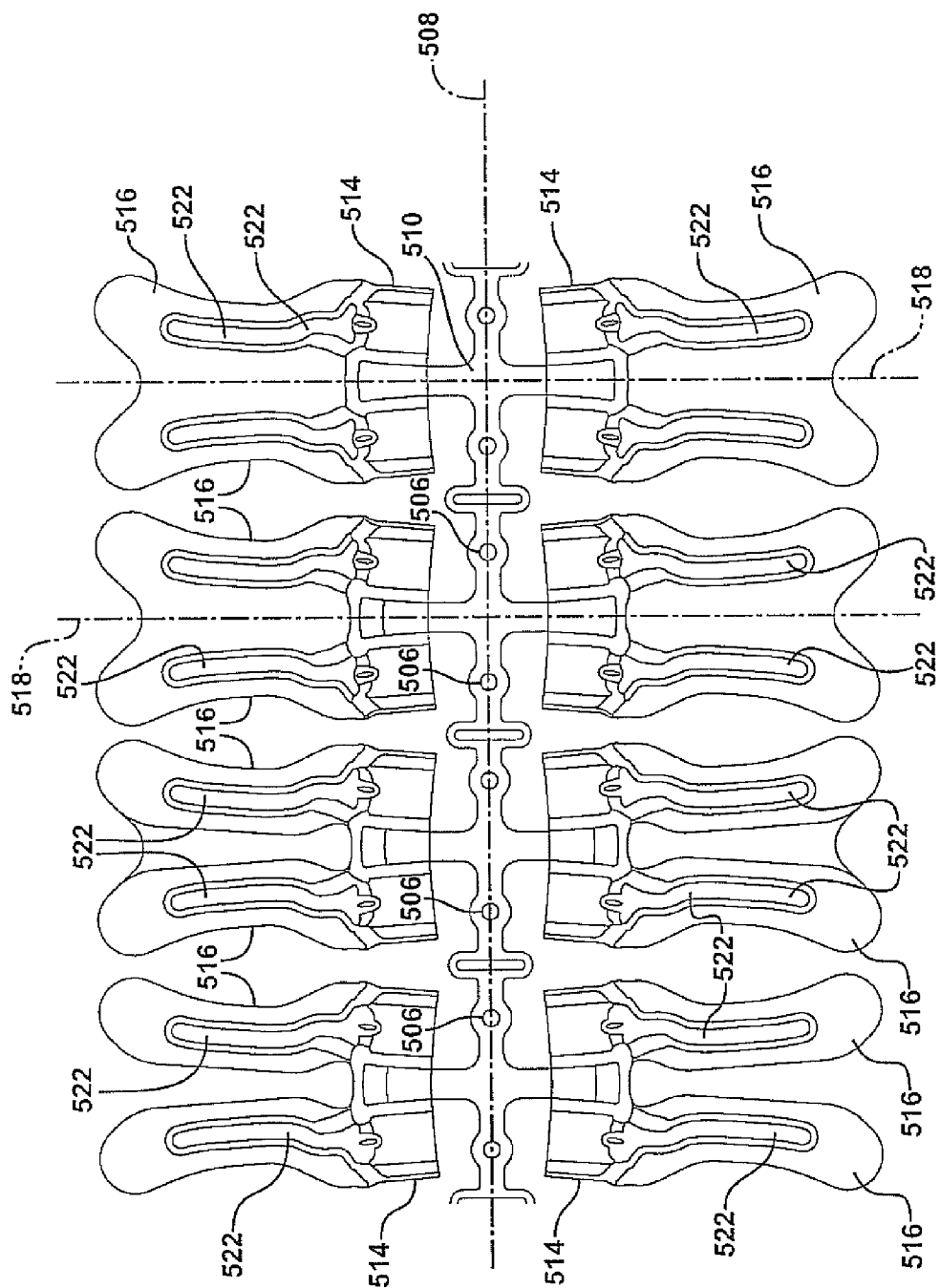

Referring to FIGS. 8A through 8F, the method of forming an alternative link 100 having a substantially common wall thickness, begins with feeding the metallic strip 500 of a uniform thickness and a predetermined value to the die (not shown). Similar to the link 30, the dimensional configuration of the link 100 is predetermined before the metal strip 500 is fed into the die. FIG. 8A presents several cut-out sections 502 to more clearly define openings as metal is trimmed away from the common metal strip 500 to form contour of the link 100. As the trimming operation begins, generally shown at 504 in FIG. 8A, the die forms a plurality of locating holes 506 along a central axis 508 of the metal strip 500. These locating holes 506 are used to receive pins (not shown) extending from the die for holding and carrying the carrier element 510 before the carrier element 510 is cut away (not shown) at the final stage, shown in FIG. 8F. This improves dimensional accuracy while forming the link 100 as set forth above.

Referring to FIG. 8A, as the initial several stages of the trimming operation begin, the metallic strip 500 is trimmed to the predetermined dimensional configuration to form two oppositely spaced blanks 512 of the link 100 having predetermined contours of the neck portion 514 and legs 516 and an axis 518, extending generally perpendicular to the central axis 508 of the metal strip 500. The contours illustrated in FIG. 8A, for example, are not intended to limit the scope of the present invention and are presented for exemplary purposes.

The trimming operation removes metal at the neck portions 514 of each blank 512 oppositely spaced from one another to form the aforementioned carrier element 510, as shown at 520. As set forth above, no further trimming is performed once the dimensional forming of the link 100 begins. Therefore the volume of the link 100 is determined while the link 100 is still in its two dimensional stage.

Figure 8C:
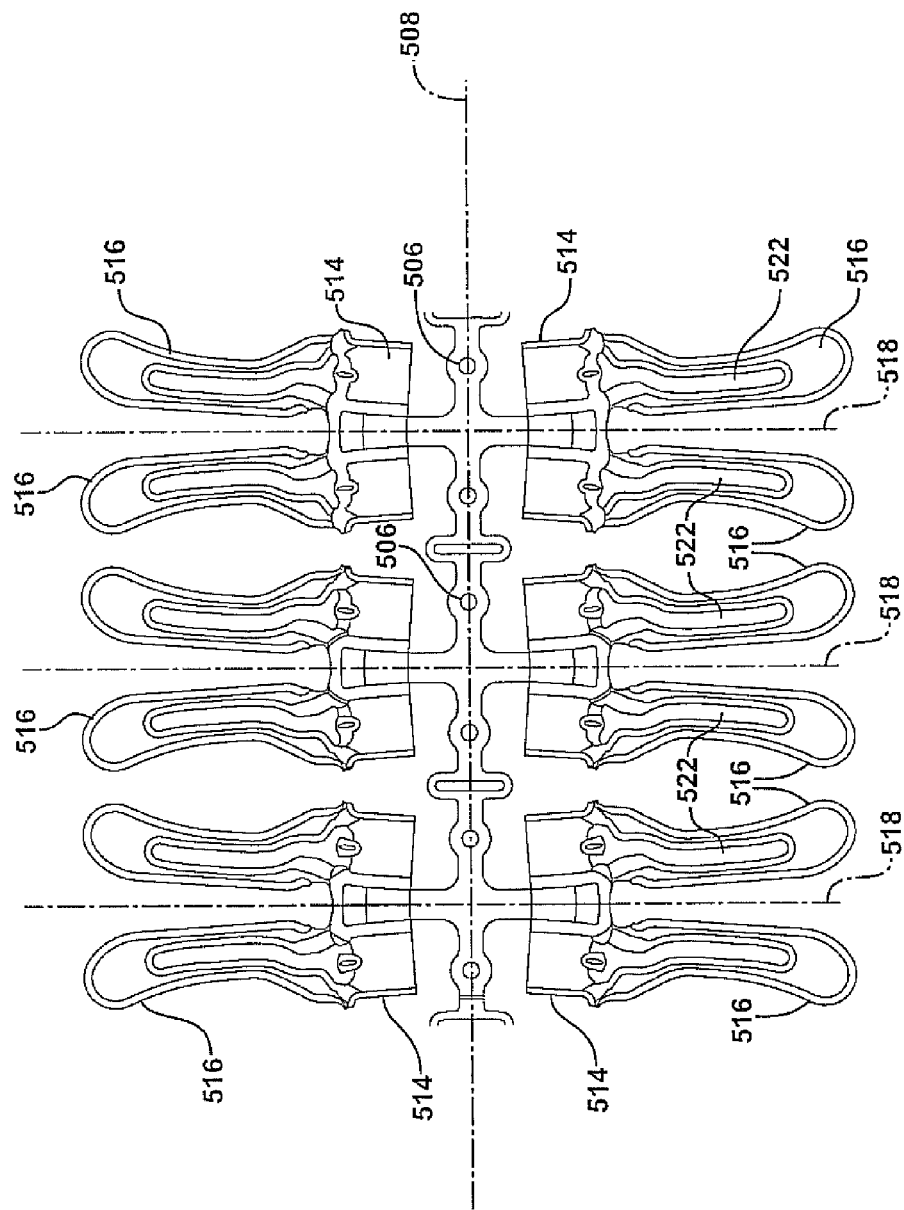
Figure 8C:
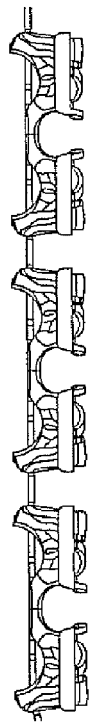

As the blanks 512 trimmed to a predetermined contours are moved along the die, the blanks 512 oppositely spaced from one another along the axis 508 are subject to several camming operations transforming from a planar cross section, as illustrated in FIG. 8A, to a three dimensional configuration, as shown in stages illustrated in FIGS. 8B and 8C while maintaining substantially constant wall thickness. The center of gravity in the link 100 is identical while the link is still in two dimension stage. As set forth above, the center of gravity provides a necessary moment of inertia enabling the link 100 having a generally constant wall thickness to support the mass of the motor vehicle. The center of gravity in the link 100 is predetermined by the ratio between the neck portion 514 and legs 516 of the link 100 before the metallic strip 500 is fed to the progressive die.

The three dimensional configuration of the link 100 is further defined by forming the reinforcement ribs 522 in each of the legs 516 by locating the reinforcement rib 522 generally in the middle of each leg 516. To maintain constant wall thickness, the neck portion 514 and the legs 516 are curled to the center 518 of the respective blank 512, i.e. the axis by the die surfaces configured to form the predetermined configuration of the reinforcement rib 522 and the neck portions 514.

Figure 8D:
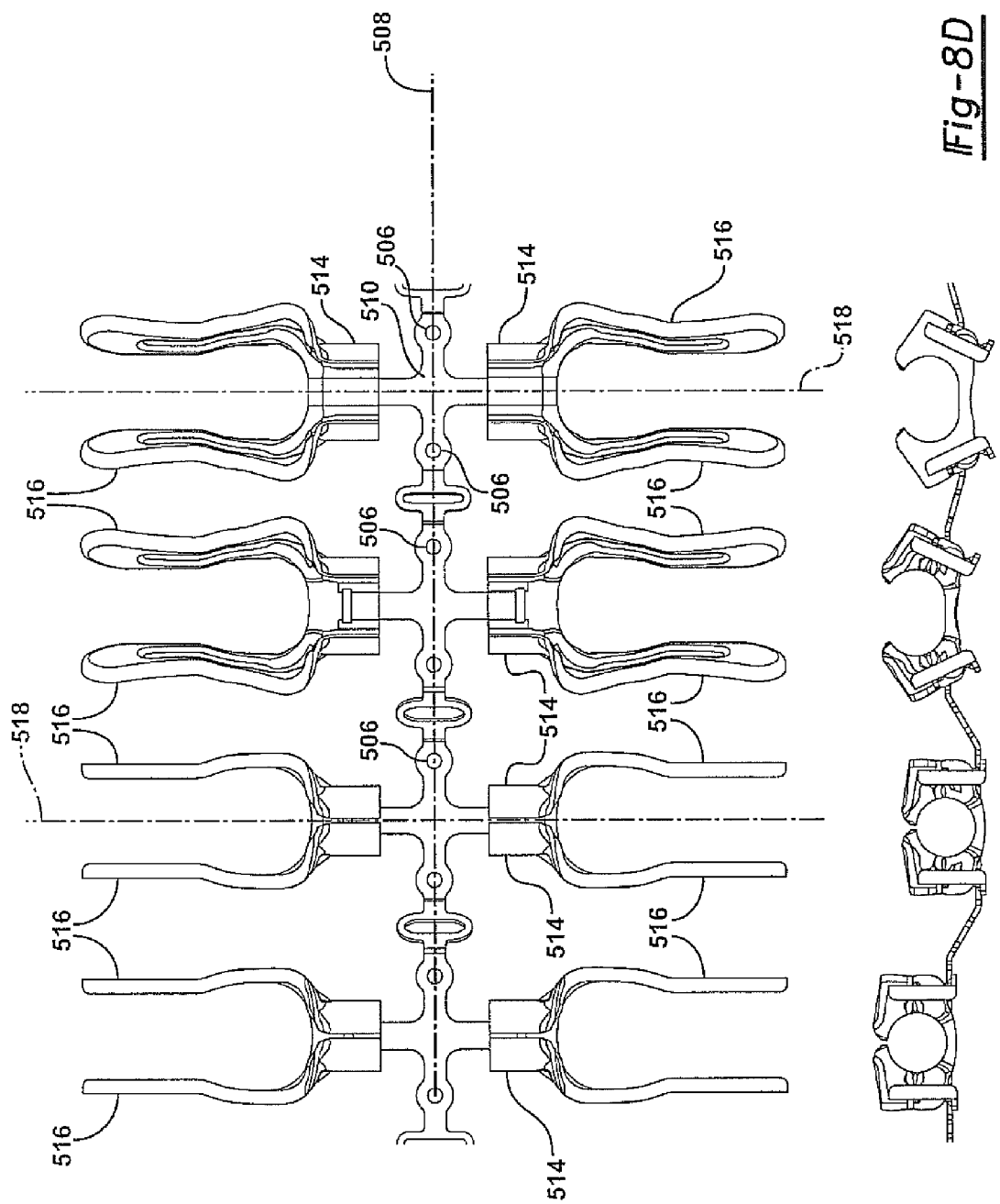
Figure 8F:
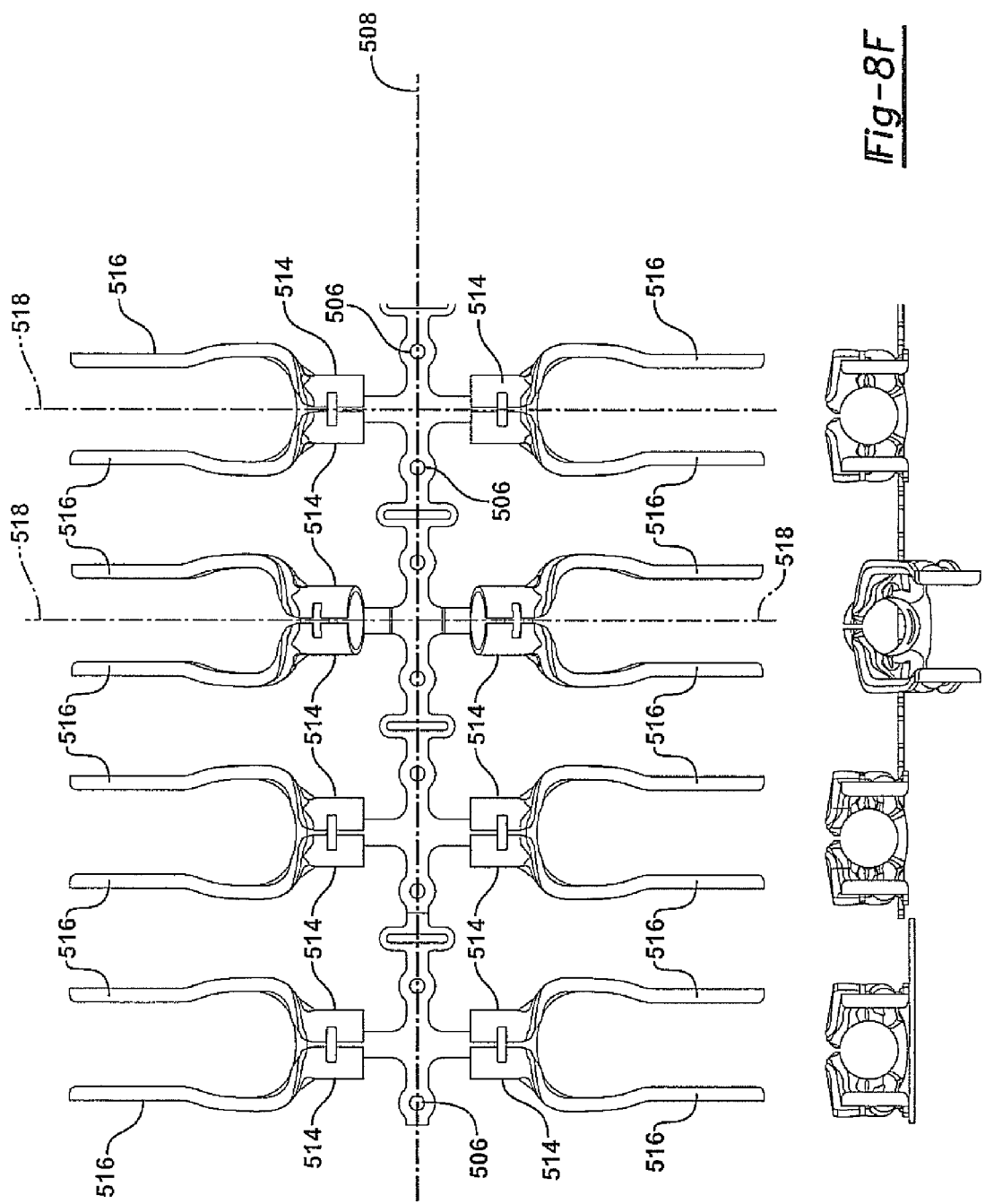

As the three dimensional configuration is formed, each blank 512 is folded in a circular fashion, as best shown in FIGS. 8D and 8E to change the position of the legs 516 from adjacent to one another along the respective axis to be oppositely spaced to one another. Therefore, each of the legs 516 includes an opening (not shown) defining a common opening axis 524. The openings in each leg 516 are used to connect the link 100 to the motor vehicle.

Folding the neck portion 514 is necessary to locate the legs 516 in an opposed orientation with slots defined in each of the legs 516 as shown in 8D. A pair of oppositely spaced elongated flanges 530 defined in the neck portion 514 is oriented along a common axis 532, as shown in 8F. As the link 100 is formed the carrier element is cut away at the final stage to separate two of the oppositely spaced links 100 supported by the carrier element from one another to move the links 100 to other operational stages at a manufacturing facility for further processing or to a customer.

The suspension system 10 of the present invention provides numerous advantages over the prior art systems, such as the systems taught by the U.S. Pat. No. 4,377,298 to Finn et al.; U.S. Pat. No. 4,583,759 to Kami et al.; and U.S. Pat. No. 5,375,870 to Smith et al. The improved links 30, 100, 200, and 300 are stamped from a sheet metal, as set forth above, present a light weight alternative to an iron cast links known in the prior art. Another advantage of the improved link for the suspension system 10 relates to reduction in the mass of the link. The improved link 30, 100, 200, and 300 has at least one reinforcement rib deformed into each of the legs of the link thereby preventing the legs from bending as the vibration damper absorbs vibration transferred from the road surface and through the wheel and to provide structural integrity to the link and the entire suspension system 10.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method of forming a clevis link having a substantially common wall thickness, said method comprising the steps of:
    feeding a metallic strip having a uniform thickness of a predetermined value into adie;
    trimming the metallic strip to form a blank, the trimmed blank includes a neck portion and a pair of legs extending from the neck portion and having peripheral edges and inner portions; and
    forming the trimmed blank into a clevis link having a three dimensional configuration while maintaining substantially common wall thickness, the formed clevis link includes a neck portion, a pair of legs extending from the neck portion, and a support flange extending from the pair of legs onto the neck portion, wherein the support flange is formed so that each of the pair of legs bows outwardly away from an opposing leg at the peripheral edge, each of the pair of legs bows inwards towards an opposing leg at the middle portion, and the clevis link is strengthened by the support flange so as to support a load greater than the mass of a motor vehicle when used in a vehicle suspension system.

2. A method of forming a clevis link as set forth in claim 1 further comprising establishing a center of gravity in the clevis link by trimming the blank to form the neck portion with the neck portion and the legs defining a peripheral edge of the blank.

3. A method of forming a clevis link as set forth in claim 1 further comprising establishing a center of gravity in the clevis link by forming a reinforcement rib in each of the legs by deforming the reinforcement rib generally in the middle of each leg as the neck portion and the legs are curled to the center of the blank.

4. A method of forming a clevis link as set forth in claim 1 including the step of forming slots in the metallic strip carrying the blanks for moving the strip along the die as the clevis link is formed, wherein the die is at least one of a progressive die, a transfer die, a line die, or combination thereof.

5. A method of forming a clevis link as set forth in claim 1 including the step of forming an opening in each of the legs to connect the clevis link to the motor vehicle.

6. A method of forming a clevis link as set forth in claim 1 including the step of folding the neck portion into the middle section thereby forming the clevis link having a generally tubular configuration having the legs disposed in an opposed orientation with slots defined in each of the legs along a second axis substantially perpendicular to the first axis.

7. A method of forming a clevis link having a substantially common wall thickness in a die for conducting various operations, said method comprising the steps of:
    feeding a metallic strip having a uniform thickness of a predetermined value through the die;
    trimming the metallic strip to form a blank, the trimmed blank includes a neck portion and legs that are required to support the motor vehicle and have inner portions extending along the legs; and
    forming the trimmed blank into a clevis link having a common wall thickness, the formed clevis link includes a neck portion, legs required to support the motor vehicle, and reinforcement ribs extending at least partially along the inner portions in each of the legs, wherein each of the reinforcement ribs is formed by deforming the reinforcement rib as the neck portion and the legs are curled to the center of the trimmed blank thereby forming the clevis link with a common wall thickness and eliminating thickness offset between the thicknesses of the neck portion, the legs and the reinforcement ribs.

8. A method of forming a clevis link as set forth in claim 7 wherein the step of trimming the blank to form the neck portion and the legs of the clevis with the neck portion and the legs is further defined by forming a peripheral edge of the blank.

9. A method of forming a clevis link as set forth in claim 7 including the step of forming slots in the metallic strip carrying the blanks for moving the strip along the die as the clevis link is formed.

10. A method of forming a clevis link as set forth in claim 7 including the step of forming a slot in each of the legs to connect the clevis link to the motor vehicle.

11. A method of forming a clevis link as set forth in claim 7 including the step of folding the neck portion thereby forming the clevis link having a generally tubular configuration with the legs positioned generally opposite from one another with slots defined in each of the legs presenting common axis.

12. A method of forming a clevis link, comprising the steps of:
blanking a sheet of metal having a substantially constant wall thickness to form a neck portion and opposing leg portions of said clevis link, wherein said leg portions are spaced apart by a central section of said neck portion;
forming a support flange in a peripheral edge of the neck portion and the leg portions;
deforming the leg portions wherein the interior or the leg portions are bowed inwardly of the neck portion;
deforming said neck portion into opposing radial neck sections spaced apart by said central section of said neck portion, said central section of said neck portion being deformed in a direction opposite to the opposing radial neck sections;
closing said opposing radial neck sections to form a tubular neck of said clevis link while holding said central neck section in a substantially constant position; and
wherein a center of gravity for the clevis link is located along a first axis bisecting the clevis link in a direction approximately parallel to the leg portions and substantially centered in the central section wherein the dimensional configuration further includes a moment of inertia in the clevis link required to support a motor vehicle.

13. The method set forth in claim 12, further including the step of retaining said central neck section in a generally planar configuration.

14. The method set forth in claim 12, further including the step of deforming said neck portion into a generally circular configuration thereby forming said tubular neck.

15. The method set forth in claim 12, wherein said step of closing said opposing central neck sections to form the tubular neck is further defined by aligning said leg portions in a substantially parallel orientation by closing said central neck portions.

* * * * *